Oct. 23, 1923.   1,471,727
J. GOMEZ
CULINARY DEVICE
Filed June 15, 1923   6 Sheets-Sheet 1

Oct. 23, 1923.

J. GOMEZ 1,471,727

CULINARY DEVICE

Filed June 15, 1923

Witnesses:
W. K. Olson
Fred M. Davis

Inventor:
Joseph Gomez

By Rummler & Rummler Attys.

Oct. 23, 1923.

J. GOMEZ 1,471,727

CULINARY DEVICE

Filed June 15, 1923     6 Sheets-Sheet 3

Witnesses:
Wm. Olson
Fred M. Davis

Inventor:
JOSEPH GOMEZ
By Rummler & Rummler Attys

Oct. 23, 1923.   1,471,727
J. GOMEZ
CULINARY DEVICE
Filed June 15, 1923   6 Sheets-Sheet 4

Inventor:
Joseph Gomez

Patented Oct. 23, 1923.

1,471,727

UNITED STATES PATENT OFFICE.

JOSEPH GOMEZ, OF JACKSONVILLE, ILLINOIS.

CULINARY DEVICE.

Application filed June 15, 1923. Serial No. 645,630.

*To all whom it may concern:*

Be it known that I, JOSEPH GOMEZ, a citizen of the United States of America, and a resident of Jacksonville, county of Morgan, State of Illinois, have invented a new and useful Culinary Device, of which the following is a specification.

This invention relates to the preparation and cooking of food, meat in particular, and especially to means for grinding or otherwise comminuting the materials, portioning and compacting the same into blocks or layers, and finally cooking the portions ready to serve, as for instance fillers for ground meat sandwiches. The invention is especially advantageous for use in connection with lunch counters, and is well adapted for use by all food venders who specialize in sandwiches of the variety referred to, as for instance in connection with fairs, circuses and other events which cause crowds to assemble outdoors. It is also well adapted for general use wherever street vending of such food is practiced.

Heretofore the methods employed in making such sandwiches have been crude and unsanitary, the operator merely squeezing a ball of ground meat in his hands to give it form and consistency and then frying it in the open air. This primitive method is untidy and unsightly and offers every opportunity for contamination and infection by dust, flies and other sources.

The main objects of this invention are to provide improved means for preparing and cooking comminuted fillers for sandwiches and the like, as for instance ground meat portions; to provide a combination blocking and cooking machine adapted to produce sandwich fillers of appropriate character and shape; to provide such a machine adapted for substantially continuous operation, as by an electric motor or any other convenient source of power; to provide such a machine having means to comminute food material, and especially to grind meat; to provide for sanitary care and protection of such a device, both as to means for frequent cleaning throughout and as to exclusion of dust and insects; to provide such a machine of light, strong and portable construction, adapted for ready care and maintenance and easy to operate; and by such means to standardize quick lunch products and meet the need and demand for a better and more sanitary sandwich.

An illustrative embodiment of this invention is shown by the accompanying drawings, in which:

Fig. 12 is a section on the line 12—12 of Fig. 2.

Figures 3, 7, 13:
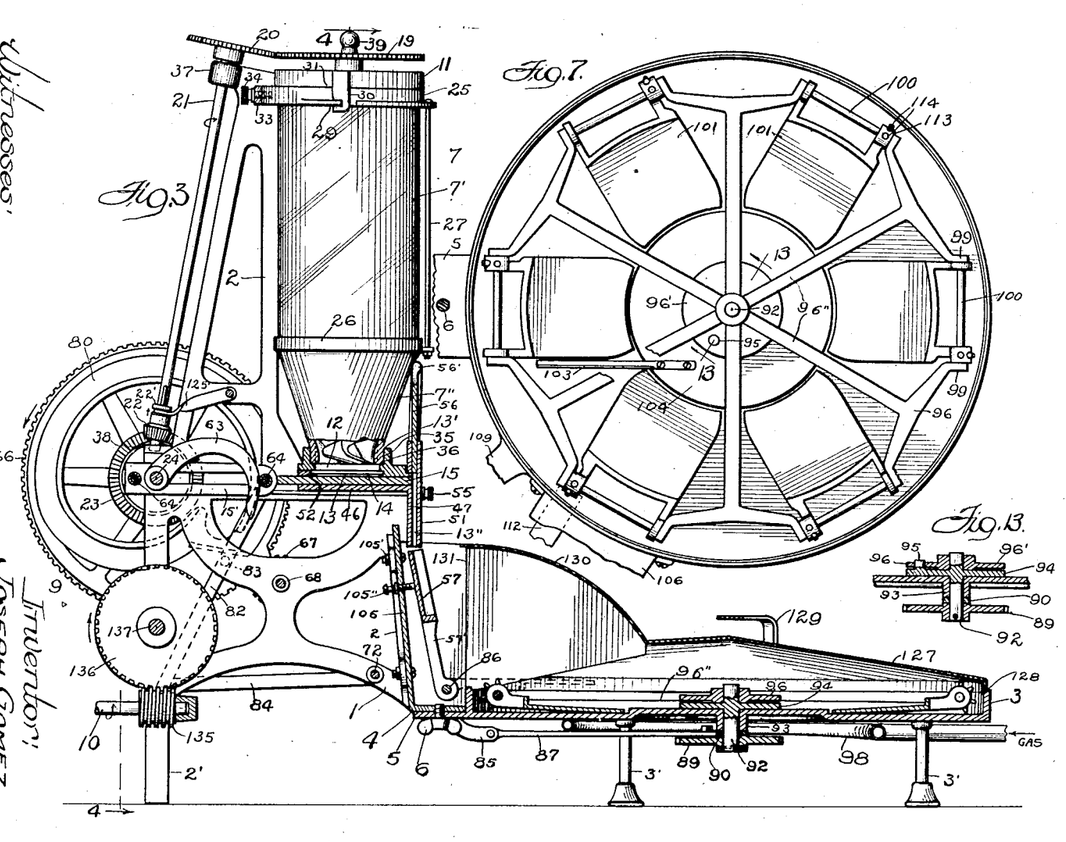
Fig. 3 is a section through the machine on the line 3—3 of Fig. 5.
Fig. 7 is a top plan of the frying pan and rotary spider-frame with the pans in place and with the cover removed.
Fig. 13 is a section on the line 13—13 of Fig. 7.

In the construction shown by the drawings the several members are all mounted on a rigid frame 1 of sectional character adapted to rest on the floor or on a table. Said frame comprises a magazine and mold supporting part 2 and a fry-pan and burner supporting part 3, detachably connected at 4 as by means of the broad horizontal lug 5 and wing-screw 6, best shown on Fig. 3, The part 2 is provided with legs 2' and the part 3 is supported on legs 3'.

On the upright frame part 2 is mounted the interchangeable hopper or magazine 7 to receive the ground meat or other uncooked filler material, and adjacent to the lower end thereof is the shaper or mold mechanism 8. Drive mechanism 9 is also mounted on this frame part, including power supply connecting means, as for instance shaft 10, leading to an electric motor or the like, not shown.

The hopper 7 is mainly in the form of a hollow cylinder set uprightly, the upper end being provided with a removable cover 11. Said hopper is made in sections and the body part 7' is preferably made of glass. The lower end section 7" is somewhat funnel-shaped, resembling an inverted truncated cone, and terminates at the discharge port 12 where the meat enters the mouth 13' of the molding pocket 13. The feeding downward of the meat is here determined by the operation of the horizontal gate 14 and feed plunger 15. Within the hopper 7 is a downwardly acting conoidal feed screw or propeller 16 carried by the shaft 17 which in turn is journaled axially in the cover 11. Said shaft is operatively connected through gears 19 and 20, shaft 21 and gears 22 and 23 to the horizontal main shaft 24. The said container 7 is provided with a collar 25 to embrace and support the cylinder 7' at the top, and the flange 26 of the part 7" embraces the lower end of said cylinder. A tension rod 27 connects these parts 25 and 26 whereby, with the assistance of frame 2, as will be explained, the unit 7 is securely held together. Said collar 25 is formed and adapted, as at 29, for interlocking with a downwardly extending lug 30 on the rim 31 of cover 11, whereby the cover 11 and propeller 16 are held down in place.

Frame part 2 has a cross-bar 33 at the top to hold a horizontally disposed thumbscrew 34 which engages ring 25 to hold the container 7 in place demountably. The gears 19 and 20 are formed and adapted to permit lifting the container unit 7 as a whole out of the frame part 2, and when the container is set in place the gears 19 and 20 come readily into mesh, and the restricted lower end 35 bears on shoulder 36 of the mold 8. The shaft 21 is journaled at 37 to the top part of frame 2, and its lower end rests in the bearing socket 38 on said frame. The knob 39 on the upper end of shaft 17 serves as a handle for lifting off the gear wheel 19 when the hopper 7 is to be refilled. Cover 11 may then be taken away from the container 7 when the fastenings 30 are released. The gear 19 is coturnable with and slidable lengthwise on shaft 17 by reason of spline screw 40 as will be understood. The shaft 17 and auger 16 are held down by pin 41 through the stop ring 42 which reacts upwardly against the cover 11 when the latter is fastened in place and the device is operated.

Figures 2, 10, 11:
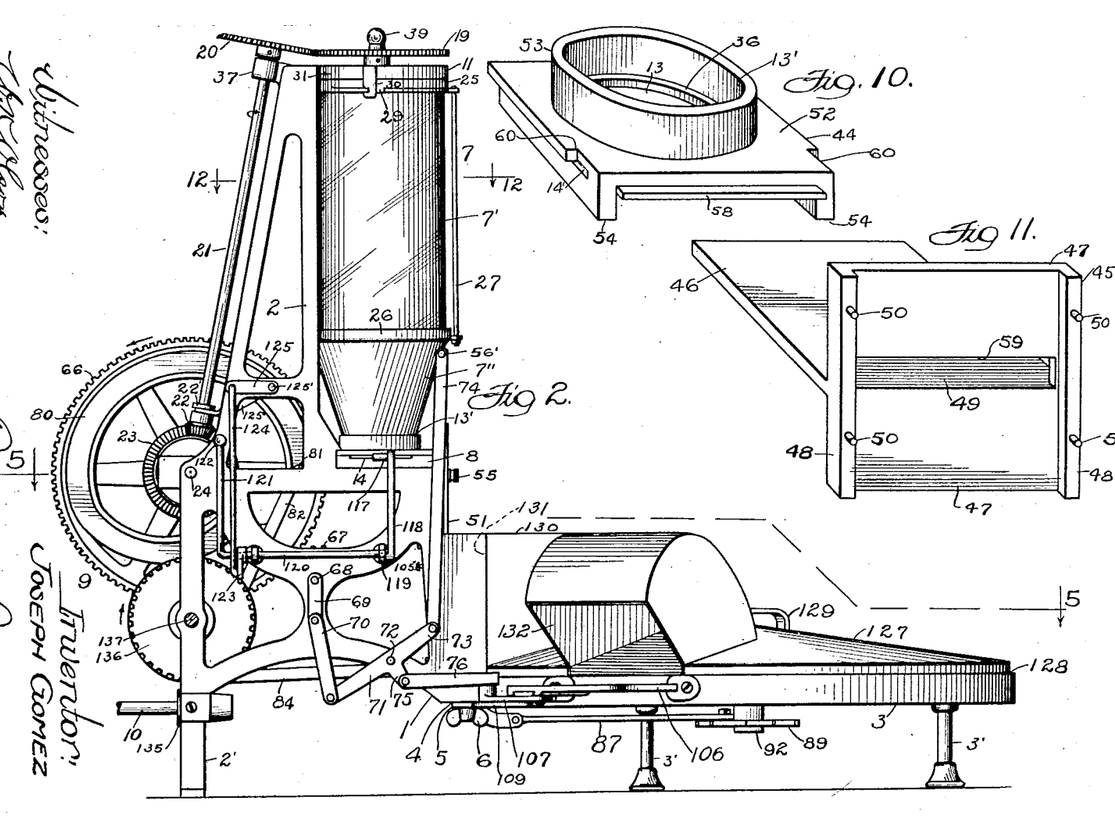
Fig. 2 is another side elevation of the machine as viewed from the opposite side, and shows the discharge opening of the meat frying part and the sandwich assembling shelf where the meat is laid on the bread.
Fig. 10 is an enlarged perspective view of one of the parts of the housing for the cake forming plunger.
Fig. 11 is a perspective view of another of the parts of said plunger housing.
Figures 4, 8, 9:
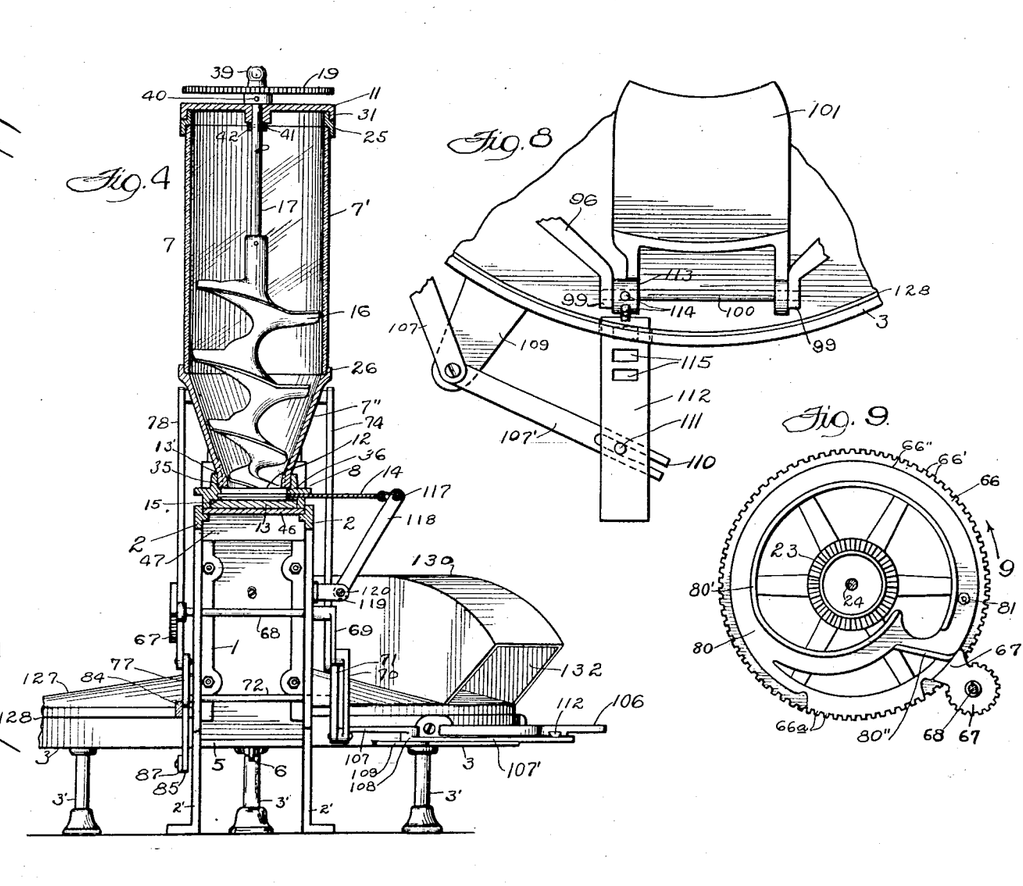
Fig. 4 is a section taken substantially on the irregular line 4—4 of Fig. 3, with certain parts of the mechanism removed to show what is behind.
Fig. 8 is mainly an enlarged plan view of one of the frying pan units, showing also the ratchet means adapted to tilt or turn the pans successively as they pass the sandwich assembling shelf, the cover and shelf being removed in this view to show the tilting mechanism.
Fig. 9 is an inner side view of the large gear wheel, which is also a cam wheel.

The molding device for forming the meat into flat compact layers of appropriate size and shape comprises mainly a pair of interfitting removable members 44 and 45, (see Figs. 10 and 11,) the former resting normally upon the latter, as shown by Fig. 4. The member 45 is T-shaped with the flat part 46 disposed horizontally to serve as the floor for the mold chamber 13, and with the vertical part 47 extending above and below at the discharge edge. The part 47 has a pair of vertical side flanges 48 extending away from part 46 and is provided with a medial horizontal slot 49 to communicate with the chamber 13 and serve as an exit therefor. The flanges 48 are provided with dowels 50 to receive the cover plate 51. The member 44 has a flat body part 52 with the collar 53 disposed upwardly about the central inlet aperture 13'. The downward side flanges 54 of member 44 rest on the floor part 46 of member 45, and the space between serves as a passageway for the mold chamber 13. Said mold chamber or passageway extends down at 13" and this part is enclosed on the inner side by wall 47 and the flanges 48 thereon, and on the outer side by the removable plate 51 held by thumb-screws 55 or the like engaging frame 2. The heads of these screws overlap the adjacent edges of plate 51 and secure it in place on the dowels 50. A downwardly acting plunger 56 in said mold part 13" is operative alternately relative to plunger 15 and serves to push the molded meat cake down out of the mold and onto the transfer plate 57. The lip 58 of member 44 projects under the upper edge 59 of slot 49 when the mold is assembled. (See Fig. 3.) The corners of member 44 are recessed at 60 to receive the upright frame parts 61 when the mold is set in place.

The plunger 15 is operated forward and back once for each revolution of shaft 24 and the gear cam arm 63 fixed thereon. Said plunger has a slotted arm 15', with rollers 64 at each end of the slot to alternately receive the thrust of arm 63. When said arm goes forward it pushes the layer of meat ahead of it and down into the mold part 13" ready for the next downward thrust of plunger 56 which ejects the meat cake onto the tilting transfer plate 57.

Figures 1, 6:
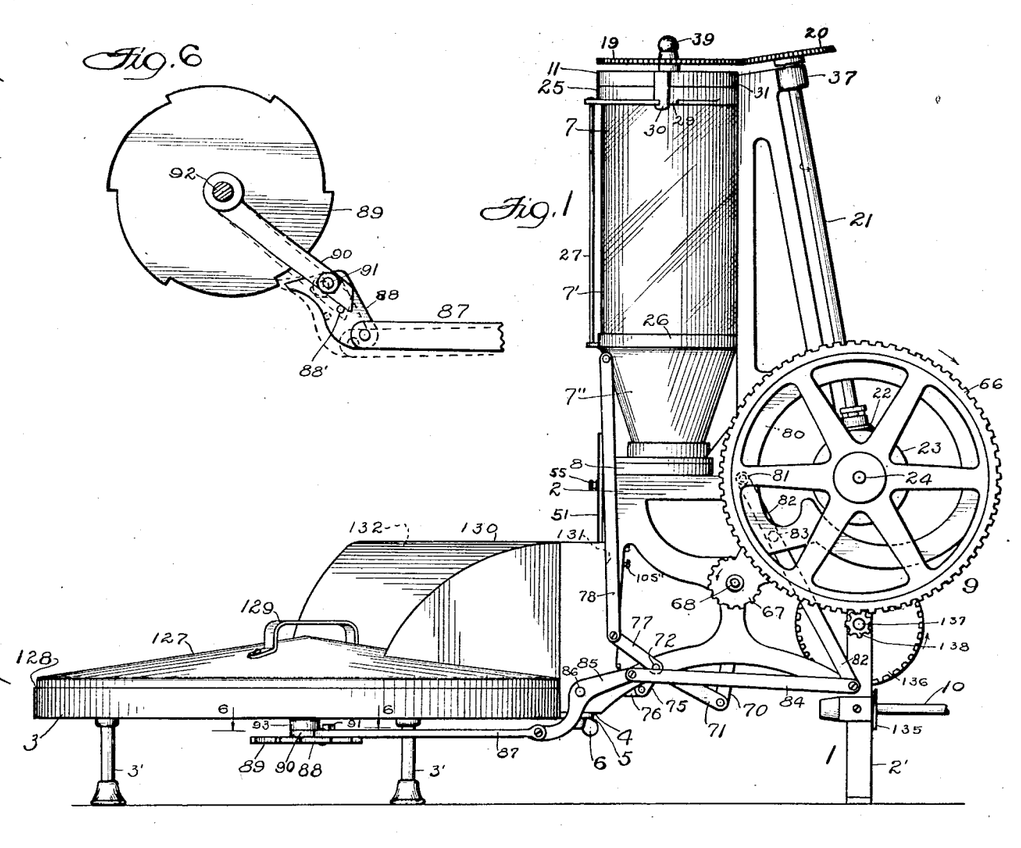
Fig. 1 is an elevation of the spur gear side of the machine.
Fig. 6 is a top view of the step-by-step ratchet for the underside of the frying pan frame.

For the purpose of operating the plunger 56, transfer 57, ratchet means shown by Fig. 6, and certain other devices in due sequence, a large combination cam and gear wheel 66 is fixed on shaft 24, and a small intermittent gear 67 fixed on a counter-shaft 68 coacts therewith, as shown by Fig. 9. The outer half of the rim of wheel 66 has a full circle of teeth as at 66', and the inner half is smooth as at 66" except a small arc, about sixty degrees, having teeth 66ᵃ.

The small wheel 67 has a projecting lug 67' on one side occupying about ninety degrees in place of teeth. This lug is formed on its outer edge to slide on the smooth part 66" of wheel 66. The rim of wheel 66 is notched at the ends of segment 66" to receive the corners of lug 67' and so tilt the latter and throw the teeth of gear 67 into mesh with teeth 66ᵃ for one revolution of gear 67.

Said wheel 66 also has the bevel gear rim 23 fixed on its inner side for driving the shaft 21. The functions of shaft 68 are to operate plunger 56 and the pan tilting mechanism for discharging the cooked meat cakes onto the bread. (See Fig. 2.)

Shaft 68 has a crank-arm 69 fixed on its end opposite from the gear 67. A link 70 connects the free end of arm 69 to the primary arm of a lever 71 mounted coturnably on a fulcrum shaft 72. Said lever 71 has two secondary arms, one of which, 73, is connected to a link 74, and the other, 75, to a link 76.

The rock shaft 72 has on its opposite end a crank-arm 77 corresponding with arm 73, and said arm 77 is connected to a link 78, similar to link 74. The links 74 and 78 are pivoted at their upper ends to the side lugs 56' of plunger 56 and serve to operate the latter. Whenever they pull plunger 56 down a cake of meat is ejected upon the plate 57.

The cam slot 80 on wheel 66 has guide flange members 80' and 80", which coact with a bearing roller 81 on the upper end of lever 82. The flange part 80' is on the inner side of the slot, is of low pitch, and extends nearly around the wheel, and serves to urge the roller 81 outwardly, as required for gradually setting the various parts ready for quick positive operation. The part 80" is on the outer side of slot 80, is of sharp pitch, and occupies only a small arc of about ten degrees. It serves to throw the roller 81 inward abruptly as required for efficient operation of the several members affected thereby, including the forward swing of plate 57 and rotation of the spider sixty degrees, as will be explained. Said lever 82 is pivoted to the frame at 83, and its lower end is pivoted to link 84. Link 84 at its opposite end is pivoted to lever 85, which is fulcrumed at 86 on the frame. The opposite end of lever 85 is connected to a link 87, which in turn is connected to the pawl 88. This pawl engages and operates the pan revolving ratchet wheel 89. (See Figs. 1 and 6.) This wheel has six teeth. The pawl 88 is carried by an arm 90 to which it is connected by a pivot bolt 91, spaced somewhat from the outer end of arm 90. Relative turning of pawl 88 and arm 90 is limited in one direction by the stop pin 88' and in the opposite direction by the wheel 89. Said wheel 89 is fixed to the short vertical shaft 92 journaled in the frame hub 93. (See Figs. 3 and 13.) The upper end of said shaft 92 is provided with a horizontal disk 94, having an upstanding lateral lug 95. The spider hub plate 96' has an axial aperture to receive the upper lip of shaft 92, and a lateral aperture to receive the lug 95. The spider is held in place by gravity and the lug 95 compels coturning of shaft 92 and spider 96. The spider hub plate 96' has radial spider arms 96" rigid therewith as may be provided by casting. These arms at their outer ends are forked, as will be described.

The radial spider 96 rotates in the shallow frame pan 3 beneath which heat is applied by any available means, as for instance a gas burner 98. Six arms 96" are here shown, corresponding with the number of ratchet teeth, and each is forked to provide bearings 99 for the fulcrum pivots 100, on which the six tiltable pans 101 are mounted. The pans 101 are normally disposed inwardly of their axes 100 and rest directly upon the hot floor plate of the oven or pan 3, whereon they slide in revolving about the axis 92. For the purpose of keeping the pans 101 clean and free from possible scorched-on material, a scraper 103 is set rigidly on the raised central part 104 of frame 3 so as to brush over the faces of the empty pans as they move from the discharge to the charge pans. (See Fig. 7.)

The transfer plate 57 is normally positioned in a nearly upright position to register with the mold outlet 13", and is supported on a pair of arms 57'. Said arms are fixed on pivot shaft 86, so that whenever the lever 85 oscillates the transfer pan operates. The frame part 2 has a plate 105 fixed thereon, as by screws 105', and on this plate is mounted a bearing screw 105" to adjust the position of transfer plate 57 when the latter is swung back to receive a meat cake.

Figures 5, 6:
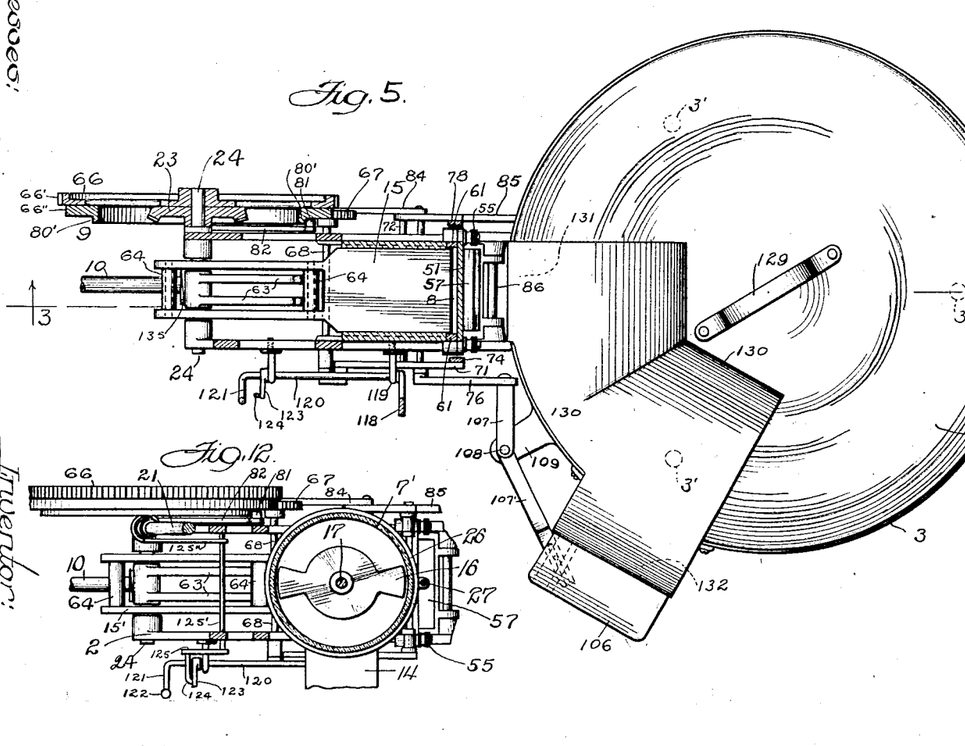
Fig. 5 is a plan view, part being in section on the line 5—5 of Fig. 2.

In order that a pan 101 may discharge the cooked sandwich meat directly onto a slice of bread, a receiving shelf 106 is provided on frame 3 opposite the last position of a plate before it reaches its loading position, (see Figs. 2 and 5), and means are provided to tilt the pans as they successively reach this position. This mechanism includes link 76 and lever 107, pivoted at 108 on frame lug 109. Said lever 107 at the outer end of its free arm 107' is forked as at 110 (see Fig. 8) and coacts with a pivot shoulder 111 on a plunger bar 112, which reciprocates in nearly a radial direction under the shelf 106.

Each pan 101 has a geared hub 113, provided with teeth 114 which engage with a longitudinal series of slots 115 formed on the inner end of bar 112. When bar 112 moves inwardly it engages the teeth 114 and so rotates the hub 113. This tilts the pan 101 upwardly and outwardly to throw the meat over onto shelf 106 on a slice of bread laid thereon. Then when the bar 112 restores outwardly the pan is swung back into place ready for the next cake.

In order to enable the operator to control the feed of meat from the magazine 7, the gate 14 is connected at 117 to an arm 118 which is pivoted at 119 to the frame 2. Rigidly connected to said arm 118 is a horizontal shaft 120, and to said shaft is connected a control arm 121 having a handle part 122. A gear control arm 123 is also fixed on said shaft 120. A link 124 extends upward from the free end of arm 123 and is connected to an arm 125 fixed on a rock shaft 125'. Another arm 125'' is also fixed on said shaft. The latter arm is forked and fits loosely on the hub 22' of gear wheel 22, which is splined on shaft 21 and is slidable upward thereon to disengage gear member 23. Hence, when handle 121 is pushed inwardly it rocks shaft 120 which in turn throws the gate 14 inwardly and lifts arm 123. This lifts the free ends of lever 125 and throws the meat propeller drive mechanism out of gear at 22. When handle 121 is pulled out the gate 14 is opened and the gear is closed at 22.

For the purpose of protecting the frying pans from dust, flies and insects, and also to conserve the heat, a cover 127 is provided. This cover fits snugly on the frame part 3 as at 128, and having a handle 129 may be lifted off readily, as for cleaning. Said cover as a whole is somewhat conoidal but is nearly flat, and is formed with a raised sector 130 on one side to provide for an inlet aperture at 131 and an outlet aperture at 132. These apertures are disposed one hundred and sixty degrees apart to correspond with the spacing of pans 101 and to register with the transfer pan 57 and shelf 106 respectively.

When the machine is to be used for making ground meat sandwiches, a hopper 7, filled with ground meat and having the propeller 16 in place, is set in position in the frame part 2 with the gear wheels 19 and 20 in mesh with each other and with the screw 34 set to lock the hopper in place. Power is then applied to the shaft 10 by any convenient means, as for instance a hand crank, an electric motor or any other available source. Power is transmitted from said shaft through the worm gear 135, wheel 136, shaft 137, and small gear 138 to the large power distribution wheel 66.

The operator then pulls out the lever 121 thereby throwing the bevel wheels 22 and 23 into gear and also opening the discharge gate 14 at the lower end of hopper 7. The propeller 16 forces the meat down into mold chamber 13, the plunger 15 already being retracted and drawn to the left. Said plunger 15 is then pressed forward by cam arms 63 toward the right as viewed in Fig. 3, whereby the meat is forced into the vertical mold part 13'', plunger 56 then being up. Thereupon the plunger 56 is pulled downwardly by the operation of the intermittent gear 67, links 74 and associated mechanism. As soon as the molded meat cakes emerge from the part 13'' they drop into the transfer pan 57 which is then swung forward through the inlet aperture 131 of cover 127 by operation of the cam lever 82 and lever 85. This operation throws the meat cakes onto one of the frying pans 101 then positioned opposite lug 5 as viewed in Fig. 7. The plungers 15 and 56 are restored by the cam 63 and gear 67 respectively.

In the foregoing operation the gear 67 not only operates the plunger 56 but also actuates the tilting means 107 and 112 which causes the pans 101 to tip upwardly and outwardly as they successively reach the position opposite the bread shelf 106 where the fried meat is discharged automatically onto the sandwich.

The several parts of the mechanism are adjusted to effect the proper sequence of the various steps and operations as will be understood without further description.

Figure 14:
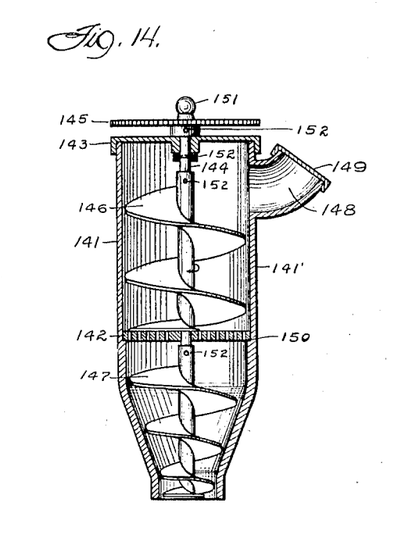
Fig. 14 is an axial sectional view of a combined grinder and magazine unit interchangeable with a plain magazine member such as shown in Fig. 4.

Referring to Fig. 14, the combination grinder and magazine unit 141 here shown is interchangeable with the unit 7. This unit comprises an oblong tubular receptacle of conoidal shape at its lower end and is provided with a medial diaphragm 142 adapted for cutting up the meat. A removable cover 143 is provided at the upper end, and a shaft 144 extends through both said cover and said diaphragm, being journaled thereon. On the upper end of said shaft is fixed a gear wheel 145 adapted to mesh with gear wheel 20. Said shaft is provided with an upper propeller member 146 to force the meat through the cutter diaphragm 142 and with a lower propeller member 147 to force the meat into the mold member, substantially as when a container 7 is used. An inlet 148 for the meat is provided on one side of the wall near the top as shown in Fig. 14, said inlet having a cover 149 which may be removed when the meat is to be fed in.

The plate 142 rests on an upwardly facing interior shoulder 150 and is removable with the screw member for cleaning. The knob handle 151 fixed with the wheel 145 on the upper end of shaft serves to lift the mechanism clear of the casing 141', the several parts being fastened together, as by pins 152. The cover 143 may be detachably secured to the shell 141' by latch means similar to what is shown on member 7, as will be understood. The operation of this unit is apparent without further description.

Although but one embodiment of the main features of this invention is herein shown and described, it is to be understood that numerous details of the construction shown and described may be altered or omitted without departing from the spirit of this invention as defined by the following claims.

I claim:

1. A device of the character described comprising, in combination, means formed and adapted to hold a substantial supply of comminuted food material, means to periodically receive, form, compress and transmit approximately uniform portions of the comminuted material from said holding means, and heat applying means to receive the formed portions successively for cooking same.

2. A device of the character described comprising, in combination, a supply magazine to receive and hold a quantity of comminuted meat, and means operative to periodically receive from said magazine uniform portions of the meat and form same into compact blocks or layers ready for cooking.

3. A device of the character described comprising, in combination, magazine means to hold meat and to uniformly apportion and compress same into blocks or layers, and automatic cooking means cooperative therewith to receive the prepared portions and apply heat thereto.

4. A device of the character described comprising, in combination, a receptacle to receive comminuted meat, and means operative to periodically receive uniform portions of the meat from said receptacle and form same into compact blocks or layers ready for cooking, said portion receiving and forming means including a discharge pocket communicating with the interior of said receptacle, reciprocating plunger means to compress the portions successively in said pocket, and means operative alternately relative to said plunger to remove the portions from said pocket.

5. A device of the character described comprising a frame, chambered means demountably secured thereon to receive meat, means to feed forward and form the meat into flat cakes or layers each adapted to serve as a sandwich portion, and means to receive and fry said cakes as they are formed and fed forward in substantially continuous succession, ready for use in making sandwiches.

6. A device of the character described comprising a receptacle for meat, means intermittently operative to urge the meat forward from said receptacle, means to apportion and successively mold the meat into the form of flat cakes suitable for sandwich fillers, a circuitously movable carrier member having individual frying pans tiltably mounted thereon, means for transferring said cakes from the molding device to said pans successively, and means to tilt the pans for removing the fried meat portions successively as they pass a predetermined discharge point.

7. A device of the character described comprising a meat receptacle, feed means to discharge meat intermittently therefrom in unit portions, circuitous frying means operatively related thereto for receiving the portions and frying same ready for use in making sandwiches, and automatic operating mechanism adapted for power drive to actuate both the feed means and the frying means.

8. A meat portioning and frying device comprising a frame, a meat receptacle detachably mounted thereon, automatic means for feeding meat forward therefrom and for portioning same as it emerges from said receptacle, circuitously operative means to receive and fry the portions in succession, means to transfer the meat from the portioning means to the frying means, power operated mechanism to drive said means, said mechanism including a continuously operating gear wheel and an intermittently operated gear member coacting therewith, whereby the meat is fed from said receptacle periodically and transferred to the frying member, means also being provided and connected for operation by said intermittent mechanism to discharge the fried meat from the frying member.

9. In a device of the character described a ground raw meat cake former comprising a frame member having therein an angular passageway for the meat, and a pair of alternately operative plungers disposed in the arms respectively of said passageway, whereby meat portions may be separated and fed forward by one plunger to the other and ejected by the latter ready for frying.

10. In a device of the character described a ground meat hopper, a cake former communicating therewith, a frying pan, and means to transfer cakes from said former to said pan.

11. In a device of the character described a ground meat hopper, a cake former communicating therewith, a frying pan, and means to transfer cakes from said former to said pan, said former having a horizontal chamber to receive meat portions from said hopper, a vertical chamber extending downwardly to receive the portions from said horizontal chamber, plungers alternately operable in said chambers to advance the portions therein and compress same and deliver them to said transfer means.

12. In a device of the character described a meat feed hopper having a vertically disposed propeller therein to urge the meat outward through the discharge aperture, and power means to drive said propeller, said hopper having a lid wherein said propeller is journaled, and said power means including a pair of coacting gears one of which is carried by the projecting upper end of said propeller and said cover, propeller and one gear being removable as a whole by lifting same away from said hopper.

13. In a device of the character described a meat cake former in combination with a cyclic frying device comprising a series of pans and supporting means therefor, step-by-step means to advance said pans into position to receive and discharge cakes, and means to transfer the cakes from said former to the pans and to remove the cakes therefrom respectively.

14. A device of the character described comprising a frame, an interchangeable attachment adapted to receive and advance a supply of meat, fastening means adapted to secure said attachment in place, and means to feed the meat forward and shape it in the form of flat cakes or layers each adapted to serve as a portion.

15. A device of the character described comprising a receptacle for meat, means to urge the meat forward from said receptacle in successive quantities each adapted to serve as a portion, means to mold said portions into the form of flat cakes suitable for sandwich fillers, a rotary member having pivotally mounted individual frying pan, tilting means to transfer said cakes from the molding device to the pans successively, and means to tilt said pans successively for discharging the fried meat portions as they pass a predetermined discharge point where bread may be placed to receive the fried meat cake.

16. A meat portioning and frying member comprising a frame, a meat receptacle mounted thereon, power means for feeding meat forward and portioning same as it emerges from said receptacle, rotary means including a series of pans to fry the portions, means to transfer the meat from the portioning means to the frying pans, mechanism to drive said frying means, said mechanism including a continuously operating gear wheel and an intermittently operated gear member coacting therewith, whereby the meat is fed from said receptacle periodically and transferred to the frying member, means also being provided and connected for operation by said intermittent mechanism to discharge the fried meat from the frying pans successively upon passing a certain point.

17. An automatic device of the character described including a frying member comprising a rotary spider and a peripheral series of frying pans tiltably mounted thereon to receive, fry and discharge meat portions.

Signed at Chicago this 11th day of June 1923.

JOSEPH GOMEZ.